Figure 1:
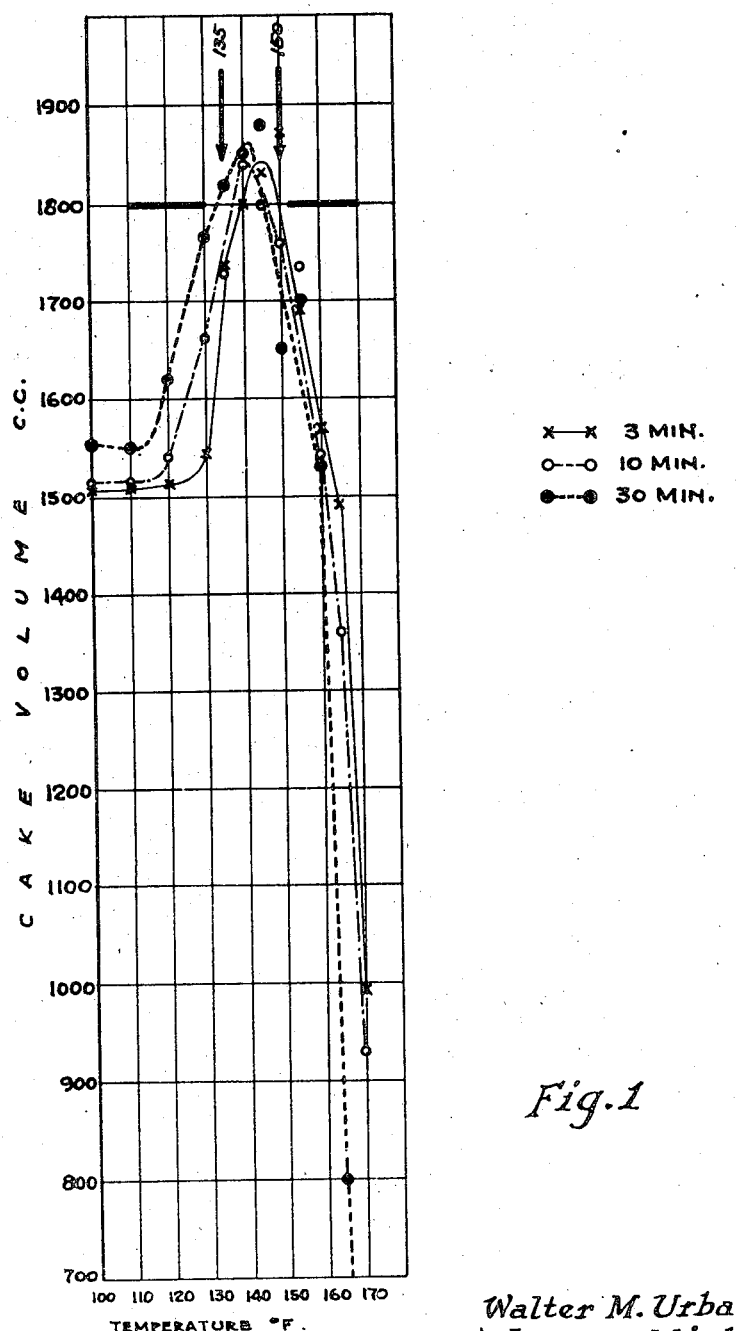

Jan. 4, 1949.   W. M. URBAIN ET AL   2,458,449
EGG IMPROVING PROCESS
Filed Jan. 22, 1944   2 Sheets-Sheet 1

Walter M. Urbain
and Leon D. Mink
INVENTORS
BY R.G. Story
ATTORNEY

Walter M. Urbain
and Leon D. Mink
INVENTORS

BY R.D. Story
ATTORNEY

Patented Jan. 4, 1949

2,458,449

UNITED STATES PATENT OFFICE 2,458,449

EGG IMPROVING PROCESS

Walter M. Urbain, Berwyn, and Leon D. Mink, Chicago, Ill., assignors to Swift & Company, Chicago, Ill., a corporation of Illinois Application January 22, 1944, Serial No. 519,310

2 Claims. (Cl. 99—92)

The present invention relates to the improvement of the baking qualities of eggs and more particularly is concerned with a process for the treatment of eggs in a manner to effect an improvement in the volume and texture of bakery products in which they are incorporated.

In commercial egg breaking plants, eggs are generally broken out of their shells and thereafter prepared for commerce by placing the liquid egg material in containers and freezing to avoid deterioration. As a general rule, the commercial value of egg material of this character resides largely in its volume-producing ability when employed in the manufacture of bakery products. The use of freshly prepared egg material does not produce the desired volume increase in baked goods. Accordingly, it has been the practice for egg breaking plants to store the egg material while in a frozen state for a period of approximately from 6 weeks to 2 months in order to effect an improvement in the volume-producing qualities over that possessed by the fresh egg material. Ordinarily, egg material which has been conditioned in this manner results in a volume increase of about 20 per cent in a bakery product over the volume increase which is secured when relatively fresh egg material is employed in the manufacture. The conditioning treatment usually employed, however, is quite expensive since it involves the storage of large quantities of egg material under freezing conditions for an extended period of time. A further objection to the storage method is that it is usually difficult to predict the salability of large quantities of egg material stored over a period of time due to changing market conditions.

Heretofore, it has been known to subject egg material to a moderate heat treatment at relatively low temperatures to effect a reduction in the bacterial count. These efforts were specifically directed to pasteurization of the product rather than the improvement in baking qualities. The conditions employed in such treatments were always carefully controlled to avoid coagulation which was generally thought to depreciate the qualities of the material.

A primary object of the present invention is to provide a process for treating egg material in such a manner as to impart an optimum improvement in volume and texture of baked products employing eggs in their manufacture.

An additional object is to provide a process for simultaneously reducing the bacterial count of egg material while increasing the volume-producing properties thereof, thereby greatly increasing the stability of the product.

Another object is to provide a process of treating egg material which will eliminate the conditioning period ordinarily employed for eggs prior to their use in bakery products.

Figure 2:
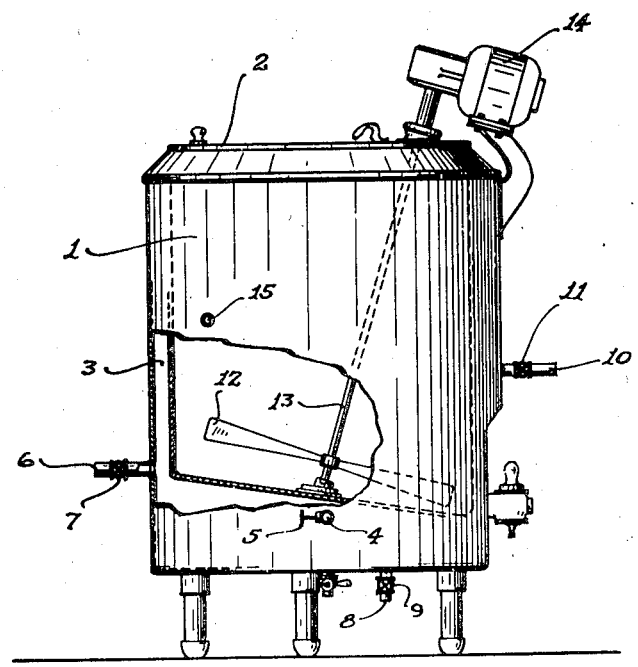

Figure 1 of the drawings is a graph. Figure 2 of the drawings shows a type of apparatus which may be used for carrying out the process of the invention.

In accordance with the invention, liquid egg material is subjected to a heat treatment at a temperature of from about 135° F. to about 150° F. under conditions to produce a substantial degree of coagulation in the liquid egg material. It has been found that, at these temperatures, the coagulation of the liquid egg material may be controlled to produce an optimum volume increase in the baked products. Particularly favorable results in the baking properties of egg material are obtained when the process is carried out at a temperature of from about 140° F. to about 145° F. Preferably, the heat treatment is sufficiently drastic to produce at least about a 20 per cent increase in volume over that which is obtained in the employment of fresh eggs. In order to attain this volume increase, it has been discovered that a substantial degree of coagulation is important. If the treatment at these temperatures fails to produce substantial coagulation, the optimum volume improvement in the baked product is not obtained. A definite relationship appears to exist between coagulation and the optimum volume obtainable in the use of egg material in a bakery process.

In carrying out the process of the invention at a temperature of from about 135° F. to about 150° F., the time necessary to produce sufficient coagulation for the optimum bakery volume decreases as the temperature of treatment increases. For example, when the process is conducted at the lower temperatures in this range, the treatment is preferably extended for at least half an hour, while at the higher temperatures in the range, the desired degree of coagulation may be obtained, in some cases, in a time period of about 3 minutes. At temperatures within the range of about 135° F. to 145° F., the period of treatment may be extended to at least an hour or for as long as 4 or 5 hours at the lower temperatures in said range with an even greater improvement in baked volume. In commercial plant operation, however, such treatments are impractical and it is generally preferred to employ treating periods not longer than a half an hour. In practice, it has been found that the treatment of liquid egg materials for periods of not greater than one half hour at the higher temperatures within the indicated range produce a product having better baking qualities than when the treatment is conducted at lower temperatures for a more extended period.

The egg material is subjected to continuous agitation during the heat treatment to provide for uniform heating of the mass and to avoid premature and excessive coagulation in localized areas. Since agitation is essential during the process, the treatment is not applicable to the treatment of eggs in the shell.

In practicing the invention, liquid egg material is placed in a suitable container and heated to a temperature of about 135° F. to about 150° F. while continuously agitating the mixture. The time period required for raising the temperature of the egg material will vary in individual cases, depending on the temperature to which it is desired that it be raised, as well as the size of the batch, and the type of equipment which is employed. For example, in efficient apparatus, about half an hour is sufficient for a 400 pound batch to attain a treating temperature of about 130° F. The rate of heat input is carefully controlled to avoid premature coagulation at the heating surfaces. The temperature is held substantially constant at the temperature of treatment and after the egg material has been maintained at this temperature for a sufficient period of time, depending upon the particular temperature employed, the material is rapidly cooled to a sufficiently low temperature to arrest the process of coagulation.

The effect on cake volume of eggs treated according to the present invention may be demonstrated by volume measurements of test cakes using fresh and treated eggs. For example, in the case of treated whole eggs, the effect may be demonstrated by preparing a standard test sponge cake using the following formula:

| | | |
|---|---|---|
| Salt | oz | ½ |
| Granulated sugar | lb | 1 |
| Whole fresh eggs | do | 1 |
| Water | oz | 2 |
| Corn starch | do | 2 |
| Cake flour | do | 8 |
| Vanilla extract | cc | 5 |

A large batch of whole eggs is thoroughly agitated to obtain a uniform mixture. A 1-pound portion of liquid egg material is removed from this batch for preparing a standard test sponge cake. The whole fresh eggs, salt, water, and sugar, are first heated on a warm water bath to a temperature of 100° F. The mixture is then placed in an electrical mixer, using a 10-quart bowl having an egg whip attachment and whipped at a moderate speed for 10 minutes. The vanilla is incorporated into the mixture during the whipping process. The corn starch and cake flour are sifted together and incorporated into the mixing bowl while the mixer is being run at a relatively low speed. The whipping process is then continued for an additional 10 seconds after scraping down the sides of the bowl. Two 300 gram portions of the batter are then placed in small angel food cake pans and baked for 35 minutes at about 360° F. After baking, the pans are inverted and allowed to cool. The volume of the cake and pan is then measured by the displacement method. The volume of the pan previously determined is subtracted from the above volume to yield the net volume of the cake. Cake prepared in this manner from a particular batch was found to have a volume of 1500 cc. The volume of the standard sponge cake prepared in the foregoing manner may be used as a control for determining the improvement effected by using the heat treated eggs in test cakes prepared therefrom.

Using the above standard test, similar portions of liquid egg material from the same batch referred to above were separately heated over a water bath at a series of specified temperatures for time periods of 3 minutes, 10 minutes, and 30 minutes respectively, so as to obtain a comparison of the results obtained by varying the period of treatment at the given temperatures. Following the heat treatment, each portion was chilled and used to prepare a test sample of sponge cake by following the identical procedure described above for preparing the standard by using the treated egg material in place of the fresh eggs. Volume measurements made on the prepared samples of sponge cake show the following results:

| Time | 3 Minutes | 10 Minutes | 30 Minutes |
|---|---|---|---|
| Temp. in Degrees F. | Cake Volume in cc. | Cake Volume in cc. | Cake Volume in cc. |
| 100 | 1,505 | 1,515 | 1,555 |
| 110 | 1,505 | 1,515 | 1,550 |
| 120 | 1,510 | 1,540 | 1,620 |
| 130 | 1,540 | 1,660 | 1,770 |
| 135 | 1,735 | 1,730 | 1,820 |
| 140 | 1,800 | 1,840 | 1,850 |
| 145 | 1,830 | 1,800 | 1,880 |
| 150 | 1,870 | 1,760 | 1,650 |
| 155 | 1,685 | 1,735 | 1,700 |
| 160 | 1,570 | 1,540 | 1,530 |
| 165 | 1,490 | 1,360 | 800 |
| 170 | 990 | 930 | 700 |

Cake volume of untreated egg material—1500 cc.

These data demonstrate that the samples of egg material treated for the specified periods at temperatures below 135° F. did not reach the required volume of 1800 cc. or 20 per cent increase over the volume of the standard. Furthermore, the portions treated for 3- and 10-minute periods showed less than a 20 per cent increase at 135° F. but at least a 20 per cent increase when treated at temperatures of 140° F. or above. The portions treated for 30 minutes at 135° F. and above showed at least a 20 per cent increase up to a temperature of 145° F. and dropped off considerably to less than 20 per cent at 150° F. Also, it is observed that the volume-producing capacity of all of the treated samples fell off badly below a 20 per cent increase at temperatures of 155° F. and above.

Referring to Figure 1 of the drawings, the volumes of sample cakes are plotted against the temperatures at which the samples employed in preparing the sample cakes were processed. The 3 curves shown on the graph follow the plotted points which represent cake volumes obtained at the specified temperatures for time periods of 3 minutes, 10 minutes and 30 minutes, respectively. It is noted that the peaks of all 3 curves representing optimum improvement in cake volume pass above the 1800 cc. line between temperatures of about 135° F. and about 150° F. In other words, egg material given the proper conditioning treatment in this temperature range will possess at least the minimum requirements from the standpoint of cake volume which have been set up in the baking industry.

In order to establish the fact that egg material processed in accordance with the invention undergoes a substantial degree of coagulation, experiments were carried out comparing the viscosity of untreated egg material with the viscosity of egg material subjected to heat treatment at various temperatures within the indicated range. Relative viscosities under the conditions employed are a measure of the degree of coagulation.

*Relative viscosity measurements at 50° F.*

| Material | Treatment | Time in Seconds |
|---|---|---|
| Distilled water | | 20.9 |
| Whole Egg | | 85.7 |
| Do | 135° F. for 10' | 85.2 |
| Do | 142° F. for 10' | 95.2 |
| Do | 145° F. for 10' | 116.2 |
| Do | 147° F. for 10' | 138.0 |
| Do | 135° F. for 30' | 100.0 |

The samples of liquid egg material treated were taken from a prepared batch of liquid whole egg material agitated to secure a uniform mixture. The method which was used to make the relative viscosity measurements was as follows:

A Bloom viscosity pipette, also known as the Standard pipette of the National Glue Manufacturers' Association (described at pages 310–315, volume 16, 1924, of Industrial and Engineering Chemistry), was employed in the measurements. The egg material was brought to a temperature of 50° F. and the viscosity pipette was also thermostated at that temperature. The measurement consisted in determining the time required for the pipette to empty and was obtained by observing the time required for the material to pass two marks on the pipette, the first indicating a full pipette and the second, an empty pipette. The time readings so obtained are proportional to the viscosity of the material in question, for example, longer periods of time indicate greater viscosity. Comparison of the time intervals for the portions of liquid egg material subjected to different conditions of treatment therefore permits conclusions as to the relative viscosities.

The recorded data indicate that no measurable increase in viscosity was obtained by the treatment of liquid whole eggs at a temperature of 135° F. for a period of 10 minutes over the untreated egg material. Inspection of the graph in Figure 1 indicates that egg material treated for this period produced a cake volume of only 1730 cc. On the other hand, extending the treating period to 30 minutes produced a relative viscosity increase of 15 seconds (using the time interval for emptying the Bloom pipette as described above as a measure of viscosities). As shown on the graph, the cake volume obtained for egg material subjected to this treatment amounted to 1820 cc. The sample treated at 142° F. for 10 minutes indicated a relative viscosity increase of about 10 seconds. As shown on the 10-minute curve in the graph, the cake volume at 142° F. is considerably above the 1800 cc. line. Moreover, the volume increase on the 10-minute curve at 147° F. is likewise above the 1800 cc. line but falls off below the line sharply thereafter, indicating that an excessive degree of coagulation has occurred in the material.

It will be observed that an increase in viscosity of about 10 to 50 seconds is obtained by treating the eggs at a temperature of 135° F. to 150° F. for about 30 to 10 minutes in time, and that such increase in viscosity produces an increase in cake volume of at least 20 per cent and a cake volume of at least 1800 cc.

Referring more particularly to Figure 2 of the drawings, an apparatus is shown which is suitable for the treatment of egg material by the process of the invention on a commercial scale. This type of mixer is manufactured by the Cherry-Burrell Company of Chicago, Illinois. In Figure 2, the numeral 1 indicates a kettle into which the batch is charged through the cover 2. The kettle is provided with a jacket 3 through which hot water is circulated during the heat treatment by means of a hot water inlet 4 having a valve 5 and a hot water outlet 6 having a valve 7. In order to rapidly cool the contents of the kettle at completion of the heat treatment, cold water is circulated through jacket 3 by means of water inlet 8 having a valve 9 and a water outlet 10 having a valve 11, valves 5 and 7 being closed during the cooling period. The contents of the kettle are thoroughly agitated throughout the heat treatment by means of a stirring device 12, driven through shaft 13 by a motor 14. The temperature of the contents may be observed during the processing treatment by means of a thermometer 15.

In a specific example, using the apparatus shown in Figure 2, 400 pounds of whole eggs were placed in the kettle and heated up to a temperature of about 137° F. The time period required to bring the batch up to this temperature was about a half an hour. The batch was subjected to agitation throughout the process. After the egg material had attained a temperature of 137° F., it was maintained at this temperature for a period of about 10 minutes and then chilled down to below a temperature of 50° F. The time required for the latter operation was about half an hour. The liquid egg material processed in this manner was found to impart a volume increase in sponge cake over 20 per cent of that obtained in the use of untreated egg material.

By means of the present invention, it is possible to realize the optimum baking qualities by the use of liquid egg material in a baking process. Moreover, the results which have been obtained are remarkable in the light of prior knowledge conerning egg material which taught that drastic heat treatment at these temperatures deteriorated the product.

By the term "liquid egg material" as employed in the specification and claims, we mean mixtures of whites and yolks as well as yolks alone.

Obviously, many modifications and variations of the invention hereinbefore specifically described may be made without departing from the scope and spirit thereof and, therefore, only such limitations should be imposed as are indicated in the appended claims.

We claim:
1. In the process of making cake baked goods of increased volume of at least 20 per cent over that obtainable with untreated egg material, the step comprising heating liquid egg material separated from the shell at a temperature of between 135° F. to 150° F. while agitating said material, and for a period of time between 3 minutes and 30 minutes to cause an increase in viscosity of the liquid egg material of from 10 to 50 seconds.

2. In the process of making cake baked goods of increased volume of at least 20 per cent over that obtainable with untreated egg material, the step comprising heating liquid egg material separated from the shell at a temperature of between 135° F. to 145° F. while agitating said material, and for a period of time between 10 minutes and 30 minutes to cause an increase in viscosity of the liquid egg material of from 10 to 50 seconds.

WALTER M. URBAIN.
LEON D. MINK.

REFERENCES CITED

The following references are of record in the file of this patent:

UNITED STATES PATENTS

| Number | Name | Date |
|---|---|---|
| 1,724,078 | Fousek | Aug. 13, 1929 |
| 2,093,786 | Swarthout | Sept. 21, 1937 |

FOREIGN PATENTS

| Number | Country | Date |
|---|---|---|
| 353,282 | Italy | 1937 |

OTHER REFERENCES

Lowe—Experimental Cookery—2d ed. 1937, page 333, John Wiley & Sons, N. Y. C.

Barott et al.—U. S. Egg & Poultry Mag., July 1943, pages 320–322.